United States Patent
Phillips

(10) Patent No.: US 7,039,831 B2
(45) Date of Patent: May 2, 2006

(54) COMMON STACK SYSTEM FOR A DEBUGGING DEVICE AND METHOD

(75) Inventor: Mark Phillips, Bristol (GB)

(73) Assignee: STMicroelectronics Limited, Bristol (GB)

(*) Notice: Subject to any disclaimer, the term of this patent is extended or adjusted under 35 U.S.C. 154(b) by 486 days.

(21) Appl. No.: 09/778,466

(22) Filed: Feb. 7, 2001

(65) Prior Publication Data

US 2002/0059560 A1 May 16, 2002

(30) Foreign Application Priority Data

Apr. 20, 2000 (GB) .................................. 0009945.7

(51) Int. Cl.
 *G06F 11/00* (2006.01)
(52) U.S. Cl. .................... 714/25; 714/30; 714/27; 714/42; 717/124; 717/162; 712/227
(58) Field of Classification Search .................... 714/5, 714/6, 30, 35, 726, 729, 747, 791, 38, 25, 714/27, 42, 43; 717/130, 162, 124, 177, 717/178, 171, 126, 127, 173; 710/269; 709/331, 709/106; 712/227, 222, 224; 719/331; 718/106
See application file for complete search history.

(56) References Cited

U.S. PATENT DOCUMENTS

| | | | | |
|---|---|---|---|---|
| 5,375,207 A * | 12/1994 | Blakely et al. | ............. | 709/203 |
| 5,394,544 A | 2/1995 | Motoyama et al. | ........... | 714/31 |
| 5,548,723 A * | 8/1996 | Pettus | ........................ | 709/228 |
| 5,561,766 A | 10/1996 | Kitamori | | |
| 5,628,016 A | 5/1997 | Kukol | | |
| 5,715,387 A | 2/1998 | Barnstijn et al. | ............. | 714/38 |
| 5,901,225 A | 5/1999 | Ireton et al. | | |
| 5,925,095 A * | 7/1999 | High et al. | ..................... | 707/2 |
| 6,006,278 A * | 12/1999 | Cottrill | ....................... | 709/330 |
| 6,023,698 A * | 2/2000 | Lavey et al. | .................. | 707/10 |
| 6,031,992 A * | 2/2000 | Cmelik et al. | ............. | 717/138 |
| 6,154,878 A * | 11/2000 | Saboff | ........................ | 717/173 |
| 6,173,421 B1 * | 1/2001 | Weaver Johnson et al. | ... | 714/38 |
| 6,223,217 B1 * | 4/2001 | Pettus | ........................ | 709/219 |
| 6,301,707 B1 * | 10/2001 | Carroll et al. | ............. | 717/177 |
| 6,311,326 B1 * | 10/2001 | Shagam | ....................... | 717/128 |
| 6,314,530 B1 * | 11/2001 | Mann | .......................... | 714/38 |
| 6,356,960 B1 * | 3/2002 | Jones et al. | ..................... | 710/5 |
| 6,360,266 B1 * | 3/2002 | Pettus | ........................ | 709/227 |
| 6,442,752 B1 * | 8/2002 | Jennings et al. | ............. | 717/162 |
| 6,493,871 B1 * | 12/2002 | McGuire et al. | ............. | 717/173 |
| 2004/0015877 A1 * | 1/2004 | Arrouye et al. | ............. | 717/127 |

(Continued)

OTHER PUBLICATIONS

European Standard Search Report from Great Britain application No. 0009941, filed Apr. 20, 2000.

(Continued)

Primary Examiner—Robert Beausoliel
Assistant Examiner—Christopher McCarthy
(74) Attorney, Agent, or Firm—Lisa K. Jorgenson; Daniel P. McLoughlin; Wolf, Greenfield & Sacks, P.C.

(57) ABSTRACT

During debugging of target system by a host system, s single stack is used for an exception by a set of applications running on the processor of the target. To achieve this, the stack is dynamically loaded by the host to a reserved memory region, and a vector of the target is set to point to that reserved memory region. The exception handlers of each application then use the vector to access the stack.

15 Claims, 4 Drawing Sheets

U.S. PATENT DOCUMENTS

2004/0025145 A1* 2/2004 Dawson ..................... 717/129
2004/0226031 A1* 11/2004 Zimmerman et al. ....... 719/331

OTHER PUBLICATIONS

European Standard Search Report from Great Britain application No. 0009940, filed Apr. 20, 2000.

European Standard Search Report from Great Britain application No. 0009943, filed Apr. 20, 2000.

European Standard Search Report from Great Britain application No. 0009939, filed Apr. 20, 2000.

European Standard Search Report from GB 0009945, filed Apr. 20, 2000.

* cited by examiner

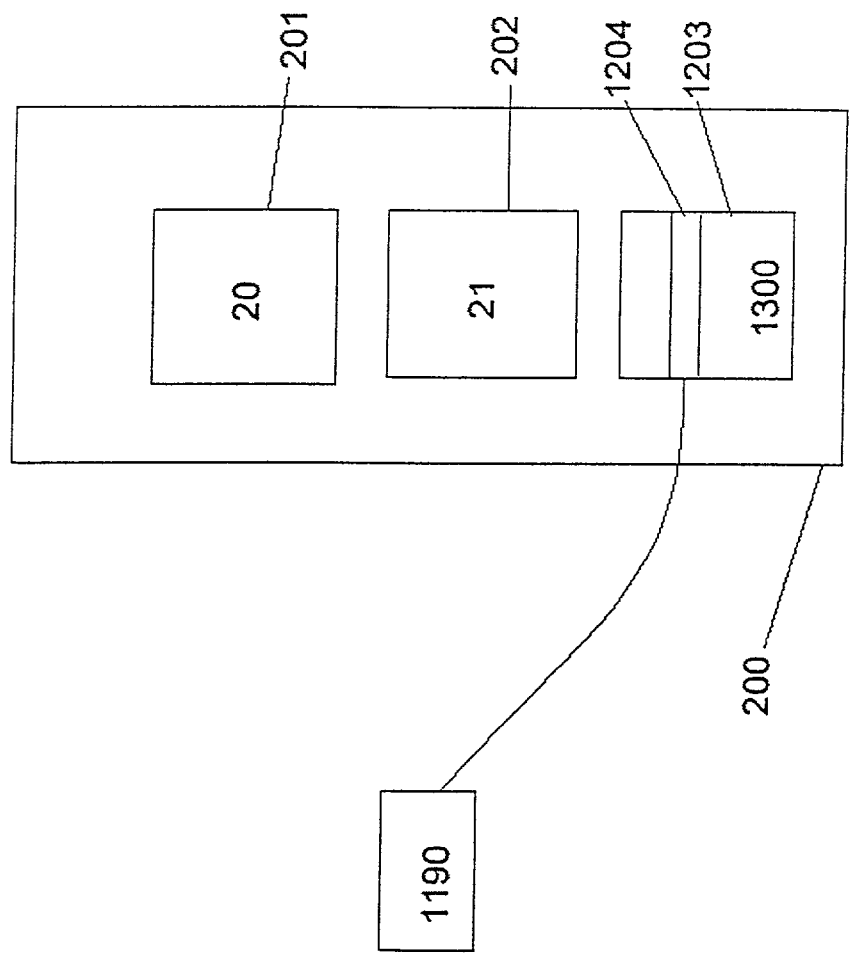

COMMON STACK SYSTEM FOR A DEBUGGING DEVICE AND METHOD

FIELD OF THE INVENTION

The present invention relates to a method of and device for debugging a target computer.

BACKGROUND OF THE INVENTION

During development and testing of an embedded computer system, especially an embedded microprocessor-based computer system, it is normally necessary to connect the system to a host computer so that an engineer can debug the embedded system. Debugging software on the host computer provides access by the engineer into the embedded system. Typically, the engineer uses the host computer and debugging software to set break points which stop threads of execution on the target embedded system, monitor registers in the target, monitor memory states and monitor input and output data. The engineer may also restart threads that have been previously stopped and perform a variety of other tasks including rebooting the target computer using the host.

Although in normal operation the embedded system may be virtually self-sufficient in that it does not in normal use need to perform input/output, it may be necessary during debugging for such input/output to be performed. Examples of this are displaying messages at the host, reading characters from the host keyboard or reading data from a file stored on the host.

Similar situations requiring input/output may occur where an embedded system is sold to an end user and the end user needs to customize the embedded system, for example writing information into programmable read only memory in the embedded system.

Embedded systems may contain more than one application, for instance stored in a read only memory or downloaded over a link, at run-time. An example of the latter is a satellite transmission link. Each such application may need to perform input/output of data to the host computer during debugging. Furthermore, applications may be interconnected so that one application that is executing may, at a virtually arbitrary point in time, cause another application to start executing. Although it is possible to provide input/output libraries during the construction of each application, such libraries, and as a result the protocol implemented by the application for input/output, may differ between applications.

It is proposed in a related application to provide a dynamically loaded library containing routines necessary for communication. Such a library may additionally or alternatively include other routines, for example subroutines that allow hardware bugs discovered during debugging to be masked or worked around. A mechanism is also proposed in a related application to allow an application to locate the dynamic library by means of the stack of an exception handler for that application.

Typically, each application may be built individually, with a linker dynamically determining the addressable locations used for protocol implementation. If there is more than one application needing to access the library, the host will not be able to determine easily which memory locations should be used at a particular point in time. It would of course be possible to arrange a system which reserved locations in memory for protocol use but this requires application developer intervention regarding the input/output implementation.

As used herein, the term 'digital signal processor' includes microprocessors' in general and other like digitally operating processing devices.

It is accordingly a primary object of the present invention to at least partially overcome the difficulties of the prior art.

SUMMARY OF THE INVENTION

According to the present invention there is provided a method of debugging a target system using a host system connected thereto, the target system comprising a digital signal processor having associated memory, said memory including a reserved storage location designated as a vector, said memory further storing plural application programs, each application program having respective associated exception handler code, the method comprising:
  dynamically loading an stack to said reserved region;
  causing the vector of said target system to point to said stack whereby all said applications use the said stack for said exception.

According to a second aspect of the invention there is provided a device for debugging a target system, the device comprising a host system connected thereto, the target system comprising a digital signal processor having associated memory comprising plural addressable locations, said target system further having a reserved storage location designated as a vector, said memory further storing plural application programs, each application program having respective associated exception handler code, the device further comprising:
  stack dynamic loading circuitry in said host for dynamically loading a stack to said reserved region, whereby said loader comprises an indication of the location in said memory of said stack;
  vector writing circuitry receiving said indication, and writing to said the vector of said target system the address of said stack whereby all said applications use the said stack for said exception.

BRIEF DESCRIPTION OF THE DRAWINGS

A preferred but non limiting embodiment of the invention will now be described with reference to the accompanying drawings in which:

FIG. 4 shows a schematic partial view of the target system showing an alternative way of accessing an entry point of a dynamically loaded library.

DESCRIPTION OF THE PREFERRED EMBODIMENT

Figure 1:
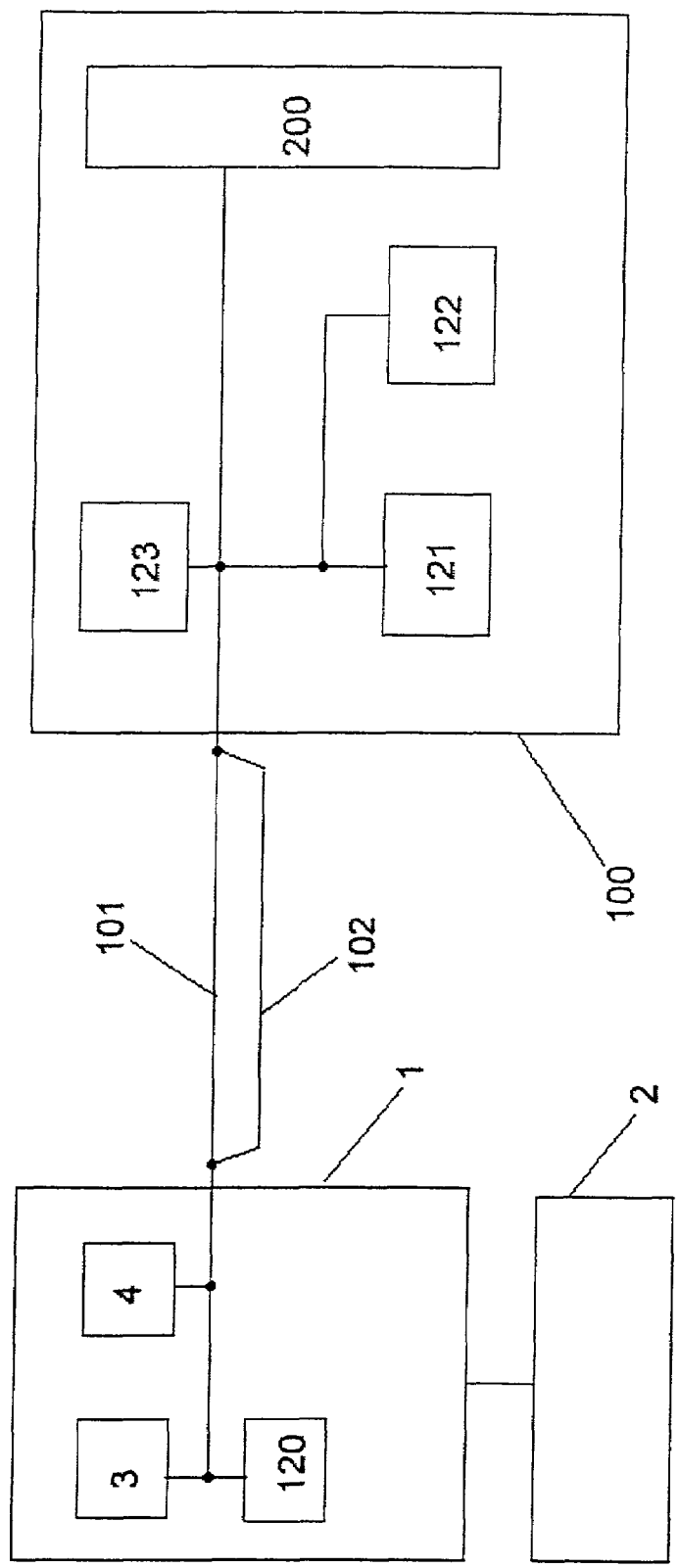
FIG. 1 shows a block diagram of a host computer connected to a target computer for downloading an input/output library.

In the various figures like reference numerals refer to like parts.

Referring first to FIG. 1, a host computer 1 includes an input device such as a keyboard 2 and runs debugging software 4 for a target embedded system 100, the host and target being connected via a communications link 101, 102. This link is shown figuratively in FIG. 1 as two separate paths with a first path 101 conveying data from the host machine 1 to the target machine 100 and a second path 102 connecting to the target computer 100 to the host computer 1. It will be understood that the link may be of any conventional type that allows two-way communication. Such communication need not be simultaneous. The target system typically includes a microprocessor or other processing circuitry, hereinafter referred to as a digital signal processor.

The host computer further includes a file 3, hereinafter referred to as a library, containing a collection of subroutines and information that will be used by the target computer to implement a multilayered communication protocol over the physical link 101, 102.

The link 101 outgoing from the host computer 1 to the target computer 100 is shown figuratively as connected to four portions of the target system, namely a first application 121, a second application 122, a block 123 whereby the embedded digital signal processor of the target system 100 may be reset, and to the volatile memory 200 of the target system.

It will be understood by those skilled in the art that the debugging software 4 may communicate over the link 101 to interrogate or monitor the registers in the target, the memory in the target, to stop and restart threads of execution.

The applications 121, 122 may be stored in read only memory or may be downloaded via a separate link (not shown) at run-time, e.g. into RAM 200.

Figure 2:
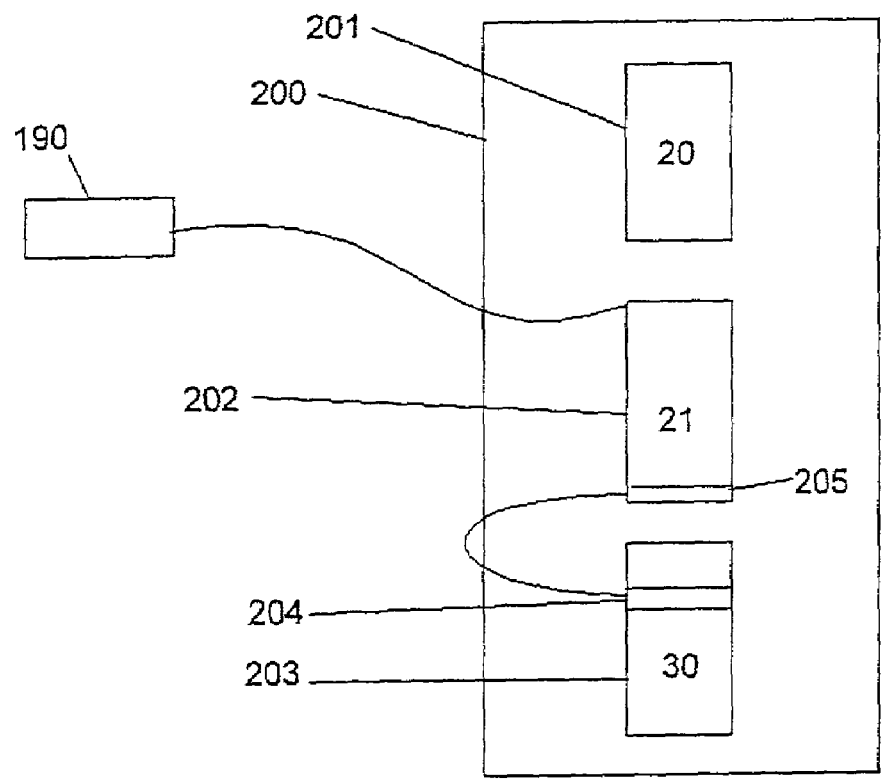
FIG. 2 shows a schematic partial view of the target system showing the use of a pointer to indirectly access an entry point of a dynamically loaded library.

Referring to FIG. 2, the target system 100 includes an exception handler 20 loaded into a memory area 201, the exception handler 20 having a stack 21 in a reserved area of memory 202 the stack including a reserved location 205. In the embodiment described, which has a negative-growing stack, the reserved location 205 is selected as the bottom of the stack. The host system 1 may dynamically load the exception handler stack into the target memory. The target includes a hard-wired location 190 accessible to both the target and the host, hereinafter referred to as a vector.

As used in this document, a vector is a reserved area, typically at a hard-wired location, used to contain address data of a key system entity. A pointer is a general holder of the address of a selected (arbitrary) entity.

At the start of debugging, the library 3 is accessed by the linker-loader 120 of the host. The linker-loader dynamically loads the library to a suitable vacant area of memory 203 of the target. As known to the skilled person, this location is determined in dependence on the usage of memory by applications, data and functions. The result is a loaded library 30 having an entry point 204 within the region of memory 203. At the time of loading the library 30 into memory, the linker-loader 120 determines where in the memory of the target to load the stack. The linker-loader stores at the bottom stack location 205, hereinafter referred to as the entry point pointer, information representing the entry point 204 and loads the location of the stack into the vector 190. It will be understood by those skilled in the art that the information stored by the vector 190 may be of various forms, including the absolute address of the exception handler stack 202 or other information such as an offset.

If the embedded system 100 is not connected to a host, no library will have been loaded and entry point pointer 205 is set to contain a predetermined value indicative of the fact that no library is available, as will be described below. This predetermined value may be a value that is not a valid address.

When an application performs input/output, the following events take place:

1. The application identifies the need to perform input/output, and calls a linked-in function setting up input/output data structures at the upper levels of the protocol.
2. The linked-in function looks for a valid address at location 205 by reading the contents of vector 190 to find the exception handler stack and offsetting to the entry point pointer 205. If the entry point vector 205 does not store a valid address but instead the "no library available" value, then the host is assumed to be disconnected. An appropriate error code is then produced.
3. If the address is valid, it is assumed to be that of the library entry point. A call is made to that entry point and the code at this address will determine whether the host is connected and whether input/output is enabled. The method of checking the library code is described later herein. If the code checks indicate either that no host is connected, or that input/output is not enabled, an appropriate error code will be determined stating the reason for input/output failure.
4. If the host is connected and input/output is enabled, the application will communicate with the debugger to carry out the input output operation and return an appropriate status code.

Figure 3:
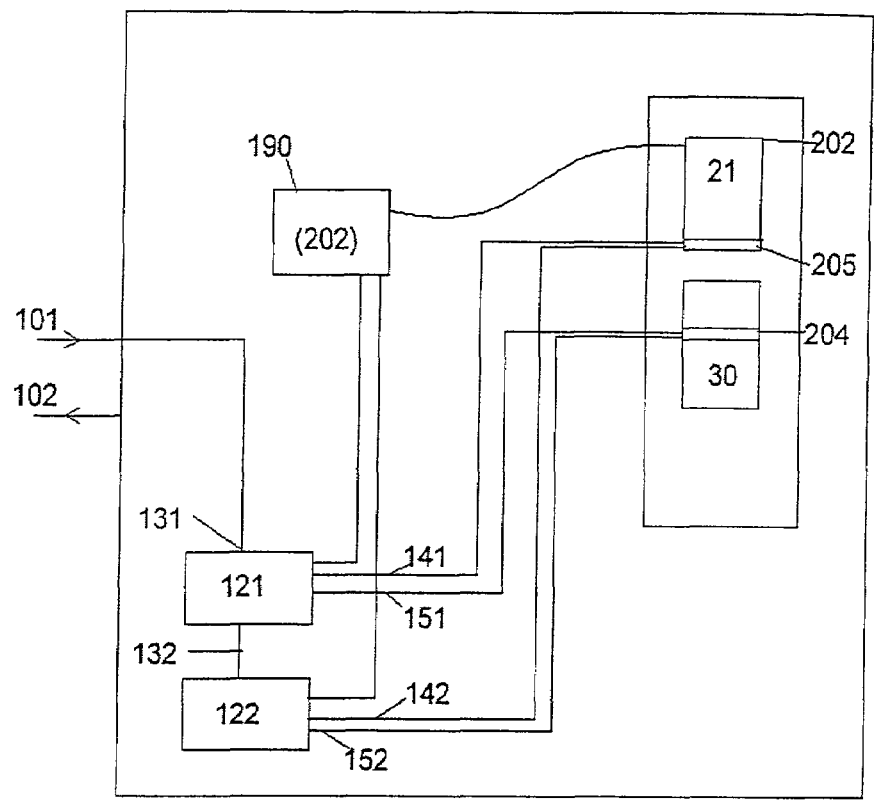
FIG. 3 shows a block diagram of a target computer showing how data communication is effected using the invention.

Referring now to FIG. 3, the first application 121 may be initiated by the host computer 1 at an input 131. If the first application 121 needs to input data from the host computer 1 then it must make use of the dynamic library 30. To do this, application 121 reads the vector 190 and from its contents accesses the address of the exception handler stack 202, offsets to the entry point pointer 205 which results in the entry point into the dynamic link library 30 being supplied to the application at input 141. The application fetches information from the dynamic link library 30 at terminal 151. The application 121 is thus able, by use of the required subroutines in the library 30 to "translate" information coming in over link 101 from the host computer.

If the first application needs to output information to the host computer, then a similar process applies.

Further inspection of FIG. 3 shows that the first application 121 is capable of starting the second application 122 over a path 132. If during execution of the second application 122 there is a requirement for the second application to input or output data from or to the host computer 1, the second application uses the vector 190 to load the entry point data from memory location 205 over the path 142 and accesses the library 30 over the path 152. This in turn enables the second application 122 to input or output data as required.

Each of the applications typically comprises a start up code.

The system described uses a single region of memory 202 for the exception handler stack 21. However, where more than one application exists in the embedded system, each may use a different region of memory for the stack of its exception handler. If this occurs, then when a host is connected, a region of memory known to the host must be reserved for this stack and the vector of the target updated to point to this region. The consequence is that all applications use a single area of stack for the particular exception. This ensures that the host has a single stack area, which it will use for the linker-loader 120 to store the address information of the library 30.

Without these measures being taken, each of the stack regions will be valid for a particular time period and the host will be unable to determine which of these stack regions to write the relevant data to at any one time.

There are three ways in which an application may start. In the first, the host starts the application, in the second the application is started by the target following reset, eg power-up, and in the third, the application is started by another application, referred to here as the initiating application.

For the first, use of the dynamic link library is necessary.

For the second, the application should run correctly without recourse to the library, and if the application tries to call the library, an error should be indicated.

However, for the third, the provision of the dynamic link library depends on how the initiating application was started. If the initiating application was started by the host, then the dynamic link library should be made available: if the initiating application started after target reset, then no library should be needed. (It will of course be understood by those skilled in the art that a whole chain of applications may exist, in which case the decision depends on how the first in the chain started up).

To cope with the above situation, the embodiment initialises the contents of the entry point pointer 205 according to the following rules:

If the host has started the application, the application start up code assumes that the entry point pointer value is valid—i.e. the host has set the value stored by the entry point pointer 205 to point to a dynamic library, which the host has downloaded to the target.

If the application has been started following reset of the target, the application start up code will place the above-discussed "no library available" value in entry point pointer 205 indicating that there is no available dynamic library.

If the application has been started by an initialising application then:
a) If the host started the initialising application, then the value stored by entry point pointer 205 is considered valid and it is considered that there is a valid library in the system.
b) If however there is no host connected, or if the host did not start the initialising application, then it is necessary to reset the contents of 205 to the "no library available" special value.

To implement these rules, the target digital signal processor supports a mechanism whereby the host can set a single bit of state in a register of the target, which is initialised upon an input to reset logic 123, i.e., a processor reset. This bit is hereinafter referred to as the "host-connected bit" and typically resides in a processor register or a memory-mapped register.

As noted above, two system start-up situations exist:
1. Ordinary, where the target executes a reset sequence, such as power up, and starts executing code at an address fixed, for example by contents of ROM within the embedded digital signal processor.
2. Via the host, in which case the host controls the reset sequence and may also control the address of the first code to be executed.

If the digital signal processor is reset using the ordinary sequence, the host-connected bit is initialised by the digital signal processor reset-logic. The start up code of the first application to be executed reads the host-connected bit, and because it is initialised determines that the host is regarded as not connected. The code then sets the contents of memory location 205 to the no-library value.

If however the host starts the target, then:
1. The host resets the target and holds it in a suspended state.
2. The host downloads the exception handler stack and adjusts the vector to point to this stack.
3. The host downloads the input/output library to the target and sets the entry point pointer 205 in the stack to contain the entry-point to this library.
4. The host inverts the host-connected bit.
5. The host releases the target from its suspended state.

Note that the order may differ from the above. For example, the library may be dynamically loaded, whereby the host determines its entry point, and then the stack—containing the entry point pointer set to the entry point—may be dynamically loaded.

In any event, the start up code of the first application then executes, reads the host-connected bit (which has been inverted) and decides that a host is connected. As a result, it is assumed that the host has loaded a library, and correctly set the entry point pointer. Thus the entry point pointer 205 is left unchanged.

The dynamically loaded subroutine is called with two machine-word sized parameters. It returns a machine-word sized value. The first parameter is a value that represents an operation to perform, the second a parameter for that operation. Certain operations do not use the second parameter. Similarly, it is not necessary for an operation to utilise the return value. The application will have been provided at the time of writing, with the values representing the operations anticipated as necessary. These values are then used in calling the relevant subroutine from the library.

Alternatively, the library may include a routine translating the values from the application into different values corresponding to those needed by the library.

One such operation will determine whether the host is connected. This operation will be used by the application by calling the input/output library subroutine with the first parameter containing a reserved value, which represents "host connected operation". The second parameter is not used by this operation so an arbitrary value may be passed. The subroutine will determine whether the host is connected with an internal action and return one of two possible values, which are "host-connected" and "host not connected".

Similar operations are used to send and receive data from the host, and to specify callback functions in the application to be used by the input/output subroutine in special circumstances.

The two-parameter model provides very good backward compatibility to legacy applications, which cannot be changed. For instance, a later dynamic library may provide additional features. Each additional feature may be accessed by using a value of the first parameter that was not available in earlier libraries. Features that were present in older libraries are provided in the newer libraries and each of these will be accessed with the same value for the first parameter in both old and new libraries. The second parameter remains a 'feature-specific' parameter.

Having provided a mechanism for loading a dynamic library onto a remote system, the same approach is useable to satisfy a wide range of run-time requirements, including but not limited to input/output. An example of such a requirement is the need to provide a work round to a hardware bug that becomes manifest during a debug session. Such bugs may only be present on a particular version or revision of the silicon. Once the problem is discovered, a routine may be written that contains a feature that may be called by the application when appropriate to prevent the bug from occurring, or to mask the bug. This routine may be incorporated within a library on the host, and loaded dynamically into the target at the start of a debug session. Components that do not possess the bug will not require the routine and may be provided with a version of the library that does not have the bug work-round feature. Such a version provides a subset of library functionality such as input/output capability.

In an alternative embodiment shown in FIG. 4, a processor register 1190, which is large enough to contain a pointer, is reserved for use by the input/output system. The digital signal processor vector to an exception handler stack and the pointer at a reserved position of the exception handler stack are not necessary. The register is initialised by the application start-up code to contain the "no library available" value if the host is not connected. If the host is connected, the host places a value in this register pointing to the entry point 1204 of IO dynamic library 1300, which the host has loaded onto the target.

When the application wishes to perform input/output, it looks at the value in the reserved register 1190. If this value is not the special 'no library available' value, it is assumed to be the address of the entry point 1204 to the input/output subroutine. The application calls the subroutine at this address to carry out input/output.

The invention claimed is:

1. A method of debugging a target system using a host system connected thereto, the target system comprising a digital signal processor having associated memory comprising plural addressable locations, said target system further having a reserved storage location designated as a vector address, said memory further storing a plurality of application programs, each application program having respective associated exception handler code, the method comprising:
   dynamically loading a stack to a reserved region of said memory;
   causing the vector address of said target system to point to said stack, whereby all said application programs use said stack for a particular exception;
   dynamically loading a library to said target system from said host system whereby said dynamically loaded library has an entry point at one of said plural addressable locations, wherein said library includes at least one routine needed for running at least one of said application programs;
   storing information indicative of the address of said one location at a reserved location in said stack;
   using said host system to start one of said application programs, whereby a running application identifies the need for said at least one routine;
   reading said vector address;
   using the contents of the vector address to access said stack;
   reading said reserved stack location to derive the entry point of said library to said one application program; and
   calling said at least one routine from said library,
   wherein said at least one routine comprises a communication routine enabling said host system and said target system to communicate.

2. The method of claim 1, wherein said at least one routine comprises a routine enabling a hardware bug to be worked round.

3. The method of claim 1, wherein said step of calling comprises supplying a first item of data indicative of the at least one routine and a second item of data for the operation to be performed by said at least one routine.

4. The method of claim 3 wherein said at least one routine returns an item of data to said one application program.

5. The method of claim 3 wherein each said data item comprises a machine word.

6. A device for debugging a target system, the device comprising a host system connected thereto, the target system comprising a digital signal processor having associated memory comprising a plurality of addressable locations, said target system further having a reserved storage location designated as a vector address, said memory further storing plural application programs, each application program having respective associated exception handler code, the device further comprising:
   stack dynamic loading circuitry in said host system for dynamically loading a stack to a reserved region of said memory, whereby said loading circuitry comprises an indication of the location in said memory of said stack;
   vector writing circuitry receiving said indication, and writing to said vector address of said target system the address of said stack, whereby all said application programs use the said stack for a particular exception;
   a computer file in said host, said file comprising a library having a routine needed by at least one of said application programs;
   library dynamic loading circuitry for dynamically loading said library to said target from said host whereby said dynamically loaded library has an entry point at one of said plural addressable locations;
   stack writing circuitry for storing information indicative of the address of said one location at a reserved location in said stack;
   control circuitry in said host for starting one of said application programs, whereby a running application identifies the need for said routine;
   vector reading circuitry in said target for reading the content of said vector address;
   addressing circuitry for using the contents of the vector address to access said stack;
   stack reading circuitry for reading said reserved stack location to derive the entry point of said library to said one application program; and
   calling circuitry for calling said routine from said library,
   wherein said routine comprises a communication routine enabling said host system and said target system to communicate.

7. The device of claim 6 wherein said calling circuitry is operable to supply a first item of data indicative of the routine and a second item of data for the operation to be performed by said routine.

8. The device of claim 6 wherein each said data item comprises a machine word.

9. A method of debugging a target system using a host system connected thereto, the target system comprising a digital signal processor having associated memory comprising a plurality of addressable locations, the target system further having a reserved storage location designated as a vector, the memory further storing a plurality of application programs, each application program having respective associated exception handler code, the method comprising:
   dynamically loading a library from the host system to the target system, the library including a communication routine enabling the host system and the target system to communicate;

dynamically loading a stack to a reserved region of the memory; and causing the vector of the target system to point to the stack, whereby all the application programs use the stack for a particular exception.

10. The method of claim 9, wherein the dynamically loaded library has an entry point at one of the plurality of addressable locations, wherein the library includes at least one routine needed for running at least one of the application programs, the at least one routine including the communication routine, the method further comprising:

storing information indicative of the address of the one addressable location at a reserved location in the stack.

11. The method of claim 10, further comprising:

using the host system to start one of the application programs, whereby a running application identifies a need for the at least one routine;

reading the vector;

using the contents of the vector to access the stack;

reading the reserved stack location to derive the entry point of the library to the one application program;

calling the at least one routine from the library.

12. The method of claim 11, wherein the at least one routine comprises a routine enabling a hardware bug to be worked round.

13. The method of claim 11, wherein the step of calling comprises supplying a first item of data indicative of the at least one routine and a second item of data for the operation to be performed by the at least one routine.

14. The method of claim 13, wherein the at least one routine returns an item of data to the one application program.

15. The method of claim 13, wherein each of the data items comprises a machine word.

* * * * *